US008694784B1

(12) United States Patent
Lekies et al.

(10) Patent No.: US 8,694,784 B1
(45) Date of Patent: Apr. 8, 2014

(54) SECURE CLIENT-SIDE KEY STORAGE FOR WEB APPLICATIONS

(71) Applicants: Sebastian Lekies, Karlsruhe (DE); Martin Johns, Karlsruhe (DE)

(72) Inventors: Sebastian Lekies, Karlsruhe (DE); Martin Johns, Karlsruhe (DE)

(73) Assignee: SAP AG, Walldorf (DE)

( * ) Notice: Subject to any disclaimer, the term of this patent is extended or adjusted under 35 U.S.C. 154(b) by 0 days.

(21) Appl. No.: 13/647,593

(22) Filed: Oct. 9, 2012

(51) Int. Cl.
*H04L 9/32* (2006.01)

(52) U.S. Cl.
USPC .......................................................... 713/169

(58) Field of Classification Search
USPC .......................................................... 713/169
See application file for complete search history.

(56) References Cited

U.S. PATENT DOCUMENTS

| | | | |
|---|---|---|---|
| 6,853,988 B1 * | 2/2005 | Dickinson et al. ............... | 705/75 |
| 7,187,771 B1 * | 3/2007 | Dickinson et al. ............ | 380/228 |
| 7,577,621 B2 * | 8/2009 | Dickinson et al. ............... | 705/75 |
| 2007/0073621 A1 * | 3/2007 | Dulin et al. ....................... | 705/50 |
| 2008/0163202 A1 * | 7/2008 | Kembel et al. .................. | 717/178 |
| 2009/0307486 A1 * | 12/2009 | Grajek et al. ................... | 713/156 |
| 2010/0104101 A1 * | 4/2010 | Dickinson et al. ............ | 380/277 |
| 2012/0170750 A1 * | 7/2012 | Orsini et al. ................... | 380/277 |

OTHER PUBLICATIONS

Johns, et al., BetterAuth: Web Authentication Revisited, SAP Research, ACSAC 2012, Dec. 2012, pp. 169-178.
Adida, B., Sessionlock: securing web sessions against eavesdropping, In Proceeding of the 17th International Conference on World Wide Web, WWW'08, Apr. 2008, ACM, pp. 517-524.
Balfanz, D., et al., TLS Origin-Bound Certificates. [IETF draft],[retrieved online: http://tools.ietf.org/html/draft-balfanz-tls-obc-01, Nov. 13, 2011, 7 pages.
Barth, A., Robust Defenses for Cross-Site Request Forgery, CCS'09, 2009, 13 pages.
Bellovin, S., Encrypted Key Exchange: Password-Based Protocols Secure Against Dictionary Attacks, Proceedings of the IEEE Symposium on Research in Security and Privacy, Oakland, May 1992, pp. 72-84.
Bellovin, Augmented Encrypted Key Exchange: a Password-Based Protocol Secure Against Dictionary Attacks and Password File Compromise, In Proceedings of the First ACM Conference on Computer and Communications Security, Nov. 1993, pp. 244-250.
Bojinov, H. et al., Kamouflage: Loss-Resistant Password Management, In ESORICS, Sep. 2010. 16 pages.
Bortz, A. et al., Origin Cookies: Session Integrity for Web Applications, In W2SP 2011, 2011, 8 pages.

(Continued)

*Primary Examiner* — Kambiz Zand
*Assistant Examiner* — Stephen Sanders
(74) *Attorney, Agent, or Firm* — Fish & Richardson P.C.

(57) ABSTRACT

Implementations of the present disclosure include methods, systems, and computer-readable storage mediums for secure client-side key storage for authentication tracking. Implementations include actions of determining, at a browser executed on a client-side computing device, that an application is authentic, the application being executed on a server-side computing device, in response to determining that the application is authentic, receiving a session signing key (SSK) at a sub-domain of an application domain, the sub-domain including a static script that handles the SSK and that selectively provides request signatures, receiving, at the sub-domain, a message requesting a request signature, determining that the message originated from an authentic origin, and in response to determining that the message originated from an authentic origin, providing a request signature to a source of the message, the request signature being based on the SSK.

10 Claims, 7 Drawing Sheets

(56) References Cited

OTHER PUBLICATIONS

Chen, E. et al., App Isolation: Get the Security of Multiple Browsers with Just One, In 18th ACM Conference on Computer and Communications Security (CCS), Oct. 2011, 11 pages.

Dhamija, R. et al., The Battle Against Phishing: Dynamic Security Skins, In Symposium on Usable Privacy and Security (SOUPS), Jul. 2005, 12 pages.

Eckersley, P., How secure is HTTPS today? How often is it attacked?, [retrieved online: https://www.eff.org/deeplinks/2011/10/how-secure-https-today], Oct. 25, 2011, 4 pages.

Eckersley, P. et al., (Decentralized) SSL Observatory. Invited Talk, Usenix Security 2011, [retrieved online: http://static.usenix.org/events/sec11/tech/slides/eckersley.pdf], Aug. 2011, 76 pages.

Hickson, I., Web Storage, W3C Candidate Recommendation, [retrieved online: http://www.w3.org/TR/webstorage/], Dec. 2011, 20 pages.

Fielding, R., HTTP/1.1, part 7: Authentication [IETF draft],[retrieved online: http://tools.ietf.org/html/draft-ietf-httpbis-p7-auth-18], Version 18, Jan. 4, 2012, 23 pages.

Franks, J., HTTP Authentication: Basic and Digest Access Authentication, [retrieved online: http://www.ietf.org/rfc/rfc2617.txt], Jun. 1999, 32 pages.

Google, Safe Browsing for Firefox, retrieved online: http://www.google.com/tools/firefox/safebrowsing/, 2007, 3 pages.

Hansen, et al., Clickjacking, retrieved online: http://www.sectheory.com/clickjacking.htm , Sep. 12, 2008, 7 pages.

Henning, E. Trustwave issued a man-in-the-middle certificate, retrieved online: http://www.h-online.com/security/news/item/Trustwave-issued-a-man-in-the-middle-certificate-1429982.html, Feb. 2012, 2 pages.

Hodges, et al., HTTP Strict Transport Security (HSTS), retrieved online: http://tools.ietf.org/html/draft-ietf-websec-strict-transport-sec-04 , Jan. 2012, 43 pages.

Jablon, Extended Password Key Exchange Protocols Immune to Dictionary Attacks, Proceedings of the Sixth Workshops on Enabling Technologies, IEEE Computer Society, Jun. 1997, pp. 248-255.

Jackson, ForceHTTPS: Protecting High-Security Web Sites from Network Attacks, In WWW 2008, 9 pages.

Johns, SessionSafe: Implementing XSS Immune Session Handling, Springer-Verlag Berlin Heidelberg 2006, Sep. 2006, pp. 444-460.

Johns, et al., Reliable Protection Against Session Fixation Attacks, In 26th ACM Symposium on Applied Computing (SAC 2011), Mar. 2011, 7 pages.

Jovanovic, et al., Preventing Cross Site Request Forgery Attacks, In Proceedings of the IEEE International Conference on Security and Privacy for Emerging Areas in Communication Networks (Securecomm 2006), 2006, 10 pages.

Klein, A. "Divide and Conquer"—HTTP Response Splitting, Web Cache Poisoning Attacks, and Related Topics. Whitepaper, Sanctum Inc., retrieved online: http://packetstormsecurity.org/papers/general/whitepaper_httpresponse.pdf , Mar. 2004, 31 pages.

Kolsek, Session Fixation Vulnerability in Web-based Applications, Whitepaper, Acros Security, retrieved online: http://www.acrossecurity.com/papers/session_fixation.pdf , Dec. 2002, 16 pages.

Krawczyk, et al., HMAC: Keyed-Hashing for Message Authentication, retrieved online: http://tools.ietf.org/html/rfc2104 , Feb. 1997, 12 pages.

Kirda, et al., Protecting Users Against Phishing Attacks with AntiPhish, In 29th Annual International Computer Software and Applications Conference (COMPSAC'05), Jul. 2005, 8 pages.

Louw, et al., BluePrint: Robust Prevention of Cross-site Scripting Attacks for Existing Browsers, In IEEE Symposium on Security and Privacy, May 2009, 1 page.

Microsoft Corporation, IE8 Security Part VII: ClickJacking Defenses, IEBlog, Jan. 27, 2009, 10 pages.

Mozilla Labs, Introducing BrowserID: A better way to sign in, retrieved online: http://identity.mozilla.com/page/5, Jul. 2011, 3 pages.

Microsoft Corporation, Mitigating Cross-site Scripting With HTTP-only Cookies, MSDN, retrieved online: http://msdn.microsoft.com/en-us/library/ms533046(d=printer,v=vs.85).aspx , 4 pages, Nov. 9, 1999.

Nadji, Document Structure Integrity: A Robust Basis for Cross-site Scripting Defense, In Network & Distributed System Security Symposium. 2009, 20 pages.

Nelson, et al., Limits to Anti Phishing, In Proceedings of the W3C Security and Usability Workshop, 2006, 4 pages.

Nikiforakis, et al., HProxy: Client-side detection of SSL stripping attacks, In Seventh Conference on Detection of Intrusions and Malware & Vulnerability Assessment, 2010, 20 pages.

Oiwa, Mutual Authentication Protocol for HTTP, [IETF draft] retrieved online: http://tools.ietf.org/html/draft-oiwa-http-mutualauth-10 , Oct. 31, 2011. 34 pages.

Open Web Application Security Project (OWASP), Cross-Site Request Forgery (CSRF) Prevention Cheat Sheet, retrieved online: https://www.owasp.org/index.php/Cross-Site_Request_Forgery_(CSRF)_Prevention_Cheat_Sheet , Sep. 2013, 10 pages.

Prins, DigiNotar Certificate Authority breach "Operation Black Tulip," [Interim Report], retrieved online: http://www.rijksoverheid.nl/bestanden/documenten-en-publicaties/rapporten/2011/09/05/diginotar-public-report-version-1/rapport-fox-it-operation-black-tulip-v1-0.pdf, Sep. 2011, 13 pages.

Roberts, Phony SSL Certificates issued for Google, Yahoo, Skype, Others, retrieved online: http://threatpost.com/phony-ssl-certificates-issued-google-yahoo-skype-others-032311, Mar. 2011, 17 pages.

Ruderman, The Same Origin Policy, retrieved online: http://www-archive.mozilla.org/projects/security/components/same-origin.html , Aug. 2001, 2 pages.

Rydstedt, et al., Busting Frame Busting: a Study of Clickjacking Vulnerabilities on Popular Sites, In Web 2.0 Security and Privacy, 2010, 9 pages.

Sandler, et al, "<input type="password"> must die!" In Web 2.0 Security and Privacy (W2SP). May 2008, 8 pages.

Sharifi, et al., A Zero Knowledge Password Proof Mutual Authentication Technique Against Real-Time Phishing Attacks, ICISS 2007, Springer-Verlag Berlin Heidelberg 2007, pp. 254-258.

Shepherd, window.postMessage, retrieved online: https://developer.mozilla.org/en/DOM/window.postMessage , Oct. 2013, 6 pages.

Stamm, Drive-by Pharming, retrieved online: http://www.symantec.com/avcenter/reference/Driveby_Pharming.pdf, 13 pages, Dec. 13, 2006.

Steiner, Secure Password-Based Cipher Suite for TLS, ACM 2001, pp. 134-157.

Sterne et al., Content Security Policy [online], W3C, Nov. 2011, retrieved from http://www.w3.org/TR/CSP/ , 17 pages.

Kesteren, Cross-Origin Resource Sharing, W3C Working Draft, Version WD-cors-20100727, retrieved online: http://www.w3.org/TR/cors/,Jul. 2010, 24 pages.

Wu, et al., Web Wallet: Preventing Phishing Attacks by Revealing User Intentions, In Proceedings of the second symposium on Usable privacy and security (SOUPS), Jul. 2006, 12 pages.

Wu, The Secure Remote Password Protocol, In Proceedings of the 1998 Internet Society Network and Distributed System Security Symposium, 1998, pp. 97-111.

Yee, User Interaction Design for Secure Systems, In Proceedings of the 4th International Conference on Information and Communications Security (London, UK, UK, 2002), ICIS '02, Springer-Verlag, pp. 278-290.

Zeller, et al, Cross-Site Request Forgeries: Exploitation and Prevention, Tech. rep., Princeton University, 2008, 13 pages.

Google, Google Authenticator, online: http://support.google.com/a/bin/answer.py?hl=en&answer=1037451 , 2013, 2 pages.

* cited by examiner

FIG. 6

SECURE CLIENT-SIDE KEY STORAGE FOR WEB APPLICATIONS

BACKGROUND

Users can access web-based applications (web applications or applications) hosted on one or more servers. In some examples, a user can access web applications through a browser, which displays web pages associated with the web application. In some applications, interaction between the user and the application is intended to be secure, in that the an identity of the user must be authenticated by the application before the user is able to access secure or confidential data through the applications, and/or perform privileged actions.

Traditional password-based authentication schemes are susceptible to various forms of attack by malicious users. Although countermeasures have been developed, the countermeasures have varying degrees of effectiveness and, in some cases, multiple countermeasures are implemented at various layers in an effort to obviate multiple attack trajectories.

SUMMARY

Implementations of the present disclosure include computer-implemented methods for secure client-side key storage for authentication tracking, the methods being performed using one or more processors and including actions of determining, at a browser executed on a client-side computing device, that an application is authentic, the client-side computing device including one or more processors, and the application being executed on a server-side computing device, in response to determining that the application is authentic, receiving a signature session key (SSK) at a sub-domain of an application domain, the sub-domain including a static script that handles the SSK and that selectively provides request signatures, receiving, at the sub-domain, a message requesting a request signature, determining that the message originated from an authentic origin, and in response to determining that the message originated from an authentic origin, providing a request signature to a source of the message, the request signature being based on the SSK.

In some implementations, determining that the message originated from an authentic origin includes comparing a target origin attribute of the message to one or more authentic origins, the one or more authentic origins including the authentic origin, and determining that the target origin is identical to the authentic origin.

In some implementations, the message includes a postMessage that is received through a postMessage application program interface (API).

In some implementations, the static script stores the SSK upon receiving the SSK.

In some implementations, the SSK is stored in at least one or local storage and session storage.

In some implementations, the static script is provided in a document hosted on the sub-domain, the document being included in a web page of the application domain using an invisible iframe.

In some implementations, the SSK is provided as a client-side SSK that is generated during a mutual authentication scheme to mutually authenticate a user of the client-side computing device and the application to each other.

In some implementations, actions further include determining that an expiration time of the SSK has lapsed and, in response, deleting the SSK from memory.

The present disclosure also provides a computer-readable storage medium coupled to one or more processors and having instructions stored thereon which, when executed by the one or more processors, cause the one or more processors to perform operations in accordance with implementations of the methods provided herein.

The present disclosure further provides a system for implementing the methods provided herein. The system includes one or more processors, and a computer-readable storage medium coupled to the one or more processors having instructions stored thereon which, when executed by the one or more processors, cause the one or more processors to perform operations in accordance with implementations of the methods provided herein.

It is appreciated that methods in accordance with the present disclosure can include any combination of the aspects and features described herein. That is, methods in accordance with the present disclosure are not limited to the combinations of aspects and features specifically described herein, but also include any combination of the aspects and features provided.

The details of one or more implementations of the present disclosure are set forth in the accompanying drawings and the description below. Other features and advantages of the present disclosure will be apparent from the description and drawings, and from the claims.

DESCRIPTION OF DRAWINGS

Like reference symbols in the various drawings indicate like elements.

DETAILED DESCRIPTION

Implementations of the present disclosure are generally directed to a password-based mutual authentication scheme for web-based authentication. More particularly, implementations of the present disclosure enable an application, hosted on one or more servers, to authenticate a user attempting to access the application through a browser, and enable the browser to authenticate the application. Implementations of the authentication scheme of the present disclosure include a mutual authentication protocol and an authentication tracking protocol. In some examples, the mutual authentication protocol is provided using an encrypted key exchange scheme, where each party respectively generates a public key and symmetrically encrypts their respective public key with an encryption key using a shared secret. In some examples, shared secret is provided based on a user password, which should be known to both parties if the parties are mutually authentic. In some examples, if mutual authentication is established, a session is promoted to an authenticated session and authentication tracking can be provided based on a session signing key.

Implementations of the present disclosure further provide secure client-side key storage. In some implementations, a sub-domain of an application domain is provided. In some examples, a static, key-handling script is provided in the sub-domain (e.g., in a document hosted in the sub-domain). In some examples, the key-handling script is solely tasked with handling/storing a session signature key confirming the authenticity of requests for request signatures that are received to the sub-domain (e.g., via a postMessage using a postMessage API). In some examples, if it is determined that the origin of the request is authentic, the script provides the request signature, which is generated based on the session signature key.

Figure 1:
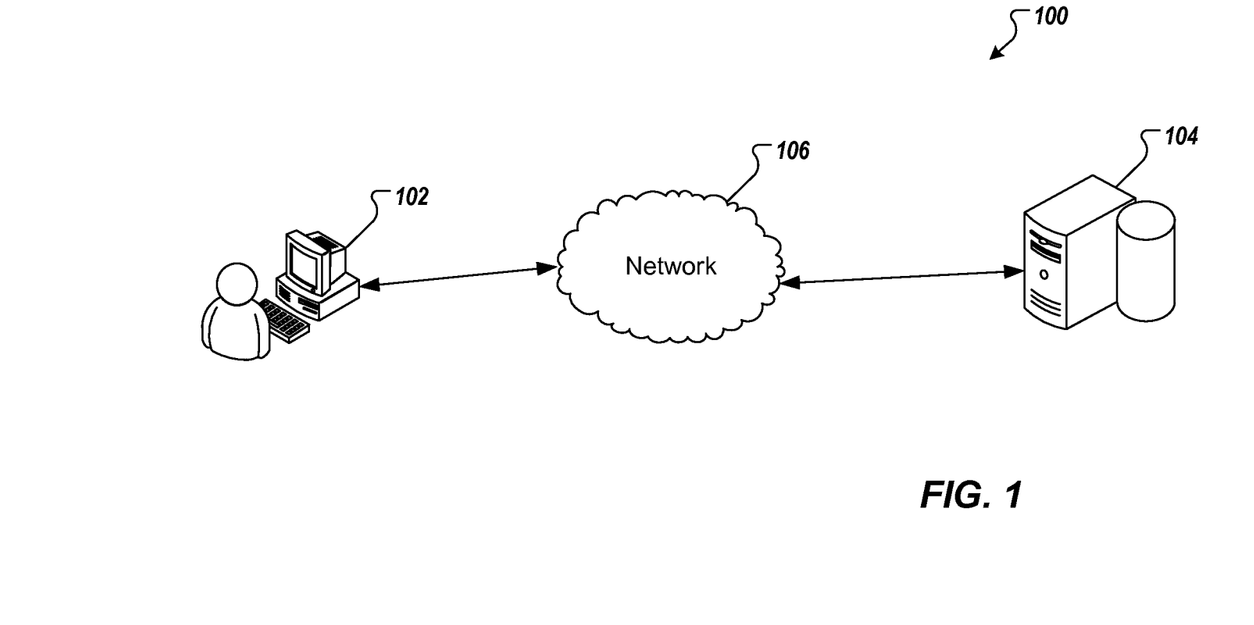
FIG. 1 depicts an example system architecture in accordance with implementations of the present disclosure.

FIG. 1 depicts an example system architecture 100 in accordance with implementations of the present disclosure. The example system architecture 100 includes a client-side computing device (a client) 102, a server-side computing device (a server) 104 and a network 106. The computing device 102 can include any appropriate type of computing device such as a desktop computer, a laptop computer, a handheld computer, a tablet computing device, a personal digital assistant (PDA), a cellular telephone, a network appliance, a camera, a smart phone, an enhanced general packet radio service (EGPRS) mobile phone, a media player, a navigation device, an email device, a game console, or any appropriate combination of any two or more of these data processing devices or other data processing devices. In the example system architecture 100 of FIG. 1, the computing device 102 is depicted as a desktop computer.

The computing device 102 can communicate with the server 104 over the network 106. The network 106 can include a large computer network, such as a local area network (LAN), a wide area network (WAN), the Internet, a cellular network, or a combination thereof connecting any number of mobile computing devices, fixed computing devices and server systems. The server 104 can include one or more computing devices and one or more machine-readable repositories, or databases.

For purposes of illustration, and as discussed in further detail below, a user can use the computing device 102 to interact with a web-based application (web application, or application) hosted by the server 104. In some examples, the web application can be provided using one or more web pages of a web site that is hosted by the server 104. In some examples, interaction between the computing device 102 and the server 104 includes executing a web browser on the computing device 102 to display the one or more web pages. In some examples, the one or more web pages include interaction elements such as dialogue boxes and clickable buttons that enable the user to provide input to the web page. In some examples, and as discussed in further detail herein, the user is required to provide user credentials before being able to access certain functionality of the web application. This process can be referred to as web authentication.

Implementations of the present disclosure will be described in view of the following general discussion of web authentication. In some examples, web authentication includes an initial authentication phase and an authentication tracking phase. In some examples, a user attempting to access a secure website, for example, provides credentials (e.g., a user ID and password) from a client (e.g., through a web browser executed on a client-side computing device) to a server (e.g., that hosts the application) during the initial authentication phase. After the user has been authenticated, the authenticated state of the user is maintained over a series of subsequent request/response pairs (e.g., HTTP request/response pairs) during the authentication tracking phase.

In general, the initial authentication phase can be provided using form-based authentication. For example, the user credentials can be communicated using a form (e.g., a HTML form). After the user has entered the user credentials, the form is submitted. In response, the web browser provides a request (e.g., HTTP request), which carries the values provided to the form. In some examples, the values include values of a GET parameter or a POST parameter. In traditional authentication, this implies that the password is sent in clear-text (e.g., unencrypted text) to the server. The server compares the submitted credentials with stored records. If the credentials match a stored record, the authentication process succeeds and the user session is promoted to an authenticated state.

In general, a messaging protocol (e.g., HTTP) is provided as a stateless protocol. Consequently, no protocol-level mechanism is provided to promote a user session to an authenticated state (as there is no inherent session concept). Accordingly, application-layer measures for session and authentication tracking are provided.

In traditional authentication tracking, a commonly used method for maintaining an authenticated state over a series of requests is to use cookies. In general, a cookie is a value that is set by a server for the domain of the server. The server sends the cookie value to the web browser, which signifies the authenticated state of the particular client-side computing device. Generally, the cookie value is sent in clear-text (e.g., unencrypted). The cookie value is stored by the web browser and all subsequent requests that are sent to the domain of the server automatically carry the cookie value (e.g., via a cookie-header). To implement traditional authentication tracking, all further requests which are received by the server and that carry the cookie value are deemed to be authenticated under the user credentials. Consequently, the cookie value is the de facto user authentication credential. In some examples, instead of setting a new cookie value, the server can promote an already existing session identifier (SID) cookie to an authenticated state, making the SID the user authentication credential.

Traditional authentication approaches are susceptible to various forms of attack. For example, and as noted above, the user credentials as well as the cookie value are communicated to the server in clear-text. This opens the communication (between the client-side computing device and the server) to various network-level attacks. For example, any party that is able to observe network traffic between the web browser and the server can simply sniff the user credentials or cookie value and abuse these under the identity of the user. For example, based on the fact that the existence of the cookie value in a request suffices that the request is recognized as authenticated, any party that can obtain the value is able to send arbitrary authenticated requests under the identity of the user. Further, parties with direct access to the network link can also launch man-in-the-middle attacks, which allow the dynamic modification of HTTP requests and responses. Session hijacking through cookie value theft is also of concern.

Another example attack can include cross-site request forgery (CSRF). In general, by default, the web browser attaches all cookie values that belong to a given domain to every outgoing request to the domain. However, due to the hypertext background of the Web, several HTTP-tags (e.g., img, script, iframe) have the inherent ability to create cross-domain requests. Regardless of the actual origin of these elements, the web browser attaches the target domain's cookies to all requests that are created this way. This circumstance opens CSRF as an attack vector. Using CSRF any website that is rendered in the web browser is able to send authenticated requests to all other websites that currently maintain an authentication context with the web browser.

Another example attack includes user interface (UI) redressing, commonly referred to as clickjacking. In general, clickjacking is an attack in the CSRF family. Clickjacking exploits the fact that, due to cookie protocols, foreign sites can load authenticated, cross-domain content into iframes. Using cascading style sheets (CSS), for example, iframes can be hidden from the user (e.g., by making them completely transparent). Consequently, the user can be tricked into interacting with a malicious web page (e.g., via clicks, drag'n'drop).

Another example attack includes "phishing," in which an attempt to steal the user password is made using a decoy website. The decoy website is under the control of the attacker and imitates domain name and design of the target web site (the website that the user expects to be displayed). The user is tricked into entering the password to the forged website under the assumption that the interaction is with the legitimate application. Because, for example, HTTP transports the user password in clear-text, the attacker is able to obtain and abuse the user password. A similar approach is followed by a "pharming" attack, a variant of phishing, which utilizes compromised domain name system (DNS) responses.

Countermeasures have been introduced to prevent or mitigate attacks that exploit authentication susceptibilities, such as the example attacks discussed above. Such countermeasures, however, are explicitly introduced and are realized at different positions and abstraction levels within the web application architecture. The use of such countermeasures can span from securing the low-level transport layer via secure sockets layer (SSL), for example, to application layer anti-CSRF prevention. Furthermore, even countermeasures that are positioned at the same level within an application architecture often have to be implemented at separate places in the application code. In some examples, even if all countermeasures hold, the basic interaction pattern is still susceptible to phishing attacks, because traditional authentication schemes can require sending the password to the server as part of each login process.

Implementations of the present disclosure are directed to an authentication scheme that overcomes deficiencies of traditional authentication schemes. In some implementations, the authentication scheme of the present disclosure provides initial authentication and authentication tracking. Implementations of the authentication scheme fulfill the following example design goals: secure by default, no security regression, use of proven primitives and established security practices, mimic traditional authentication approaches and support a transitional phase.

With regard to the example design goal of being secure by default, the use of bare bones mechanisms provided by the web paradigm results in numerous potential security flaws, as discussed above. Such security flaws have to be addressed by the web application developer, operator and/or on the framework level. In contrast, implementations of the authentication scheme of the present disclosure are secure by default. That is, implementations of the authentication scheme are secure against potential attacks, such as the example attacks discussed above, without requiring any countermeasures or configurations. With regard to the example design goal of no security regression, implementations of the authentication scheme are at least as secure as traditional authentication schemes that include countermeasures.

With regard to the example design goal of using proven primitives and established security practices, basic properties and interaction patterns have been well understood in view of decades of experience. Implementations of the authentication scheme leverage this experience to use proven primitives and established security practices (e.g., passwords do not need to be sent over the network to conduct authentication). Further, implementations of the authentication scheme use existing functionality whenever available (e.g., use a single communication protocol (HTTP) for all browser/server interactions. With regard to the example design goal of mimicking traditional authentication approaches, implementations of the authentication scheme minimize the effort to change existing applications to use the authentication scheme without constraining the set of usage scenarios should. Consequently, implementations of the authentication scheme are at least as flexible as traditional authentication approaches and enable established interaction patterns between browser and server to be changed as little as possible and the proposed. With regard to the example design goal of supporting a transitional phase, a fallback authentication approach can be used for browsers that do not support implementations of the authentication scheme should be possible using current.

In some implementations, the authentication scheme of the present disclosure provides a plurality of sub-protocols. In some examples, a sub-protocol includes a mutual authentication protocol with integrated key negotiation. In accordance with implementations of the mutual authentication protocol, a browser and a server mutually prove their knowledge of a password and jointly generate a per-session shared secret. In some examples, a sub-protocol includes an authentication tracking protocol that uses the shared secret. In accordance with implementations of the authentication tracking protocol, request signing is provided. In some examples, and after authentication has been established, each request from the browser to the server can be signed using the shared secret. In some examples, and as discussed in further detail herein, the shared secret is used if certain criteria are satisfied. In some implementations, only requests having a signature based on the shared secret are regarded as authentic by the server.

In some implementations, the mutual authentication protocol achieves at least two goals: both the browser and the server are mutually authenticated by proving that both know the password, and a fresh shared secret is generated to be used in further communications between the browser and the server. In some implementations, these goals can be realized by leveraging the Diffie-Hellman-based encrypted key exchange (EKE) scheme. In some examples, each party (browser and server) respectively generates a Diffie-Hellman public key and symmetrically encrypts their respective public key with an encryption key. In some examples, the user password is a shared secret (if authentic, both the user of the browser and the server know the user password). In some examples, the user password can be provided as the encryption key. In some examples, the encryption key can be directly derived from the user password (e.g., a salted password hash). In some examples, the encryption key is the same for both the browser and the server.

The browser and the server exchange the encrypted public keys and decrypt the received values using the password-based encryption key. In this manner, both parties are able to determine the Diffie-Hellman secret key. Only if both parties use the same password to encrypt and decrypt the Diffie-Hellman public keys, do both parties end up with the same secret key. Consequently, a successful key exchange (where both parties end up with the same secret key) implicitly indicates the authenticity of both participants. Because the key exchange is encrypted with an initial shared secret (e.g., the user password), the mutual authentication protocol is safe against man-in-the-middle attacks. Further, the user password is not sent over the network, effectively protecting against sniffing or phishing attacks.

In some implementations, if the mutual authentication protocol has successfully concluded, the parties share a fresh symmetric key, which serves as the basis for authentication tracking for subsequent communications. In some implementations, the authentication tracking protocol can be realized using hash-based message authentication code (HMAC), which is an established message authentication code scheme that utilizes cryptographic hash functions. In some examples, the browser attaches an HMAC-based signature to all further requests to the server. In some examples, the signature is only attached to requests that satisfy particular criteria, as discussed in further detail herein. This mimics traditional authentication tracking approaches, which add cookie headers to outgoing requests, as discussed above. In some examples, for GET requests, the URL is provided in a normalized form and selected request headers are signed. In some examples, normalization can include rewriting the URL such that it is represented using the same sequence of characters (syntax) as another URL that has the carry the same semantics. For example, the URL http://a.net?a=val&b=val has the same semantics as the URL http://a.net?b=val&a=val, but the URLs have different syntax. Consequently, one or both URLs can be normalized to provide the same syntax. In some examples, for POST requests, the POST parameters are included in the signature. Only requests, for which the server can successfully validate the correctness of the HMAC-based signature are recognized to be properly authenticated. In this manner, the authenticity and the integrity of the received requests are ensured.

In view of the above, implementations of the authentication tracking protocol sign outgoing requests, if the origin of the request (the web page that initiated the request) is already in an authenticated state with the server. Consequently, so-called in-application authentication tracking is enforced. All requests that are generated in the browser from outside of the application (from third party websites) are not signed. Consequently, third part websites are not treated as authenticated by the server.

While a strict enforcement of this approach would provide robust security guarantees, it can be too inflexible to cater to all existing usage patterns. For example, social bookmarking services, provide one-click interfaces to add bookmarks from external pages. Such requests, however, would need to be processed in the user's authentication context, as they commit state changing actions. Because such requests are generated from outside of the application's authentication context, they would not receive a signature. Therefore, to enable such scenarios, implementations of the present disclosure support the declaration of public interfaces. In some examples, a public interface is provided as a URL for which the server opts-in to receive authenticated requests, even if they originate from outside of the application's authentication context. In some examples, public interfaces of an application, if any are provided, are communicated to the browser during the initial key exchange (e.g., using a simple policy format).

As discussed above, and as implied by the example design goals, the authentication scheme of the present disclosure aims to stay as close as possible to established web interaction patterns. This approach materializes itself in aspects of the authentication scheme. For example, the mutual authentication protocol follows the interaction scheme originally introduced with HTTP authentication. As another example, the criteria and methods used in the authentication tracking protocol follow the behavior of cookies.

Figure 2:
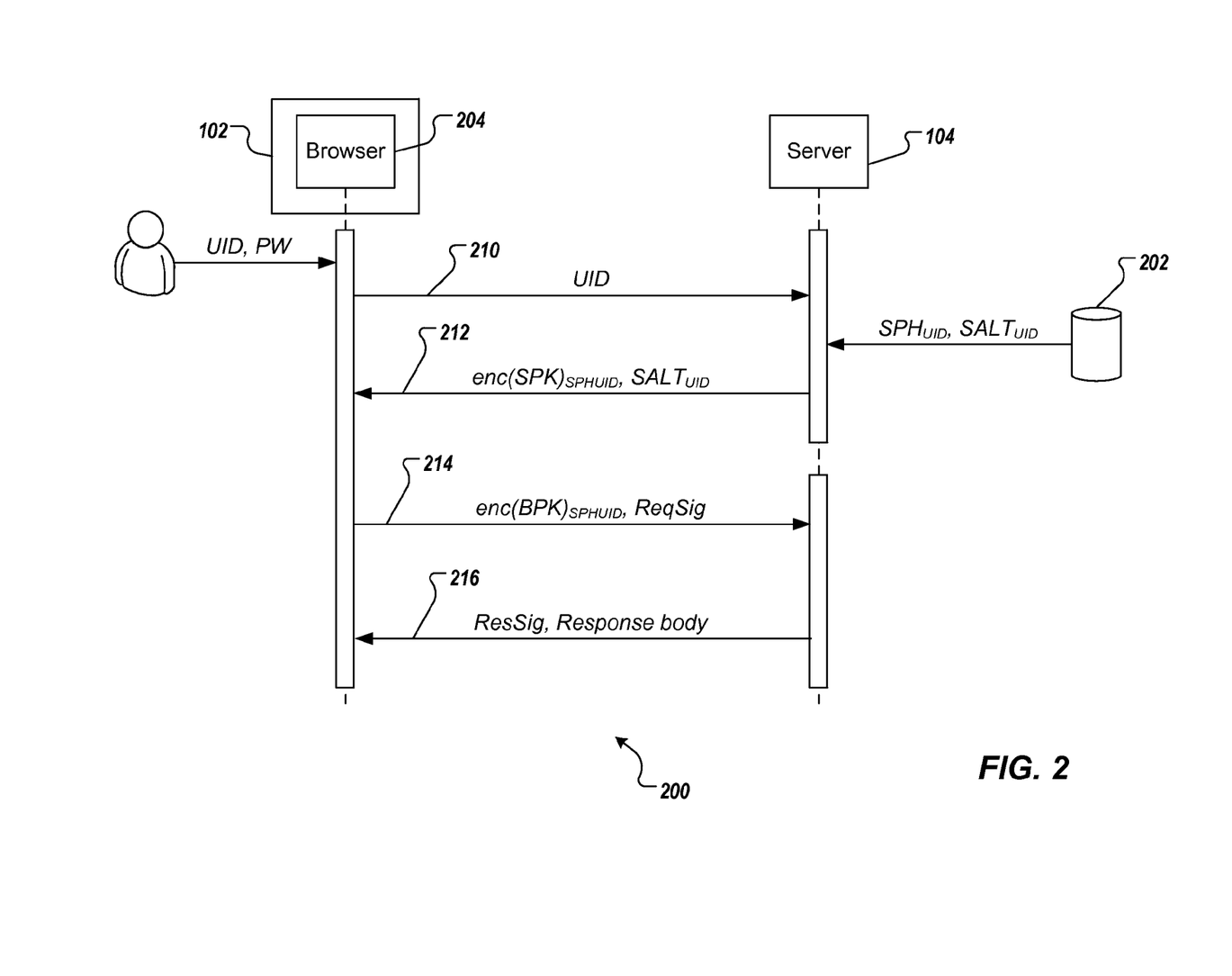
FIG. 2 depicts an example authentication scheme in view of cryptographic values.
Figure 3:
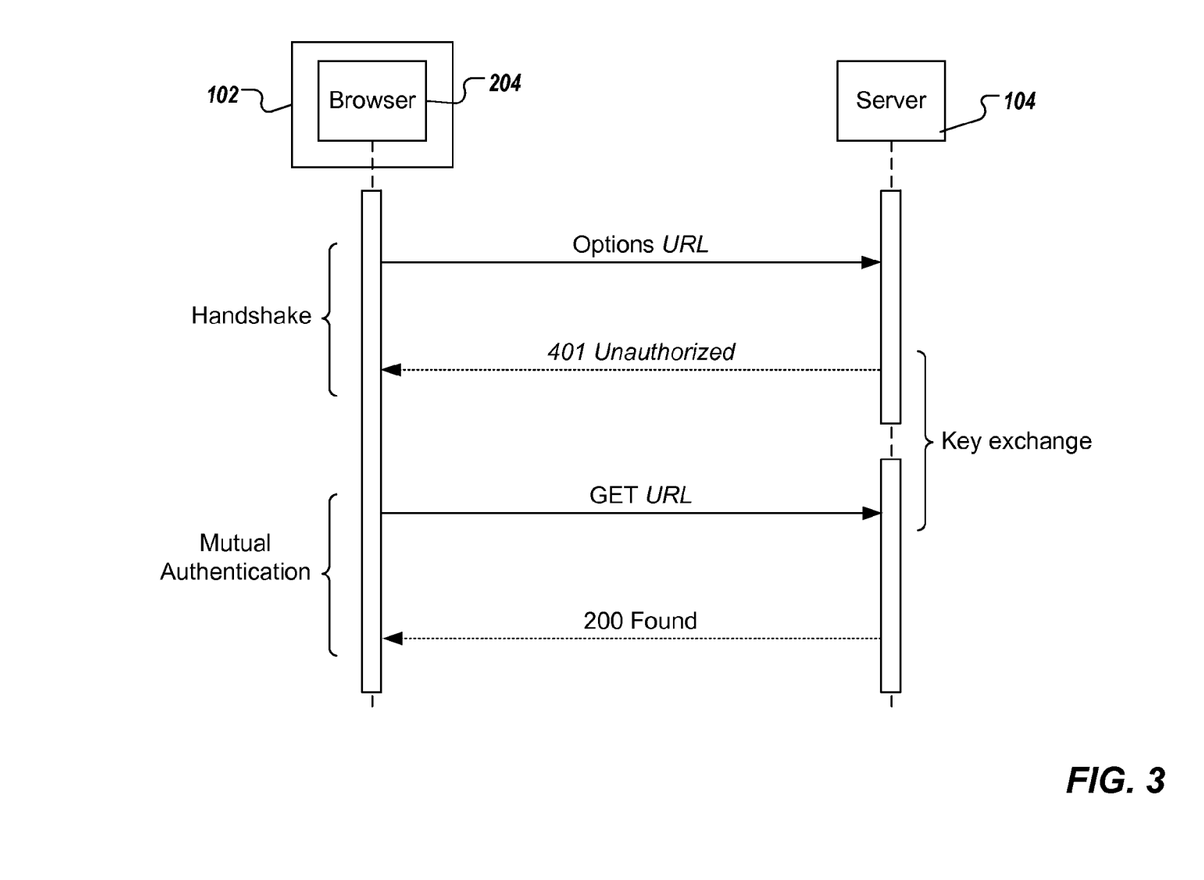
FIG. 3 depicts the example authentication scheme of FIG. 2 in view of messages.

Referring now to FIGS. 2 and 3, implementations of the present disclosure will be described in further detail. In the following discussion, and in some examples, hash( ) refers to a cryptographic one-way hash function, and enc( ) and dec( ) respectively refer to the encryption and decryption operations using a symmetrical cipher. In some implementations, SHA256, AES with 256-bit key length and 1024-bit Diffie-Hellman keys can be used.

FIG. 2 depicts an example authentication scheme 200 in accordance with implementations of the present disclosure. The example authentication scheme 200 is provided in view of cryptographic values. In some examples, before the authentication scheme 200 starts, the user knows their user ID (UID) (e.g., in the form of a login name) and password (PW). On the server side, and before the authentication scheme 200 starts, UID is linked to a salted password hash ($SPH_{UID}$). In some examples, UID and PW can be established during a previous registration process, during which the user registers with an application hosted on the server (e.g., creates a user profile and establishes user credentials).

In some examples, $SPH_{UID}$ is calculated using a user-specific salt value ($SALT_{UID}$) based on the following example relationship:

$$SPH_{UID}=\text{hash}(PW;SALT_{UID})$$

In some examples, $SALT_{UID}$ and $SPH_{UID}$ are provided during the registration process and are stored in computer-readable memory 202. In some examples, $SALT_{UID}$ is provided as a user-specific, randomly chosen value that is calculated at some point in time. In general, in authentication tracking schemes, a salt is generated when a user registers for a service and is used at each subsequent request to validate the user password. By not storing a normal, but a salted hash, brute force attacks are much more difficult (e.g., if a malicious user is able to steal the hashes). In some examples, PW can be changed (e.g., the user decides to change their user password). Consequently, PW, $SPH_{UID}$ and $SALT_{UID}$ can be changed during a password change process, and $SPH_{UID}$ and $SALT_{UID}$ can be updated in the computer-readable memory 202.

In some implementations, the mutual authentication protocol includes a set of two request/response pairs forming the key exchange handshake. In some examples, the user is presented with a graphical user interface (GUI) within a browser 204 executed by the computing device. The user interacts with the GUI to input their user credentials. In some examples, the GUI can be provided using a standard HTML form containing specially marked input fields for UID and PW. The HTML form can be provided from the application that is hosted on the server 104 and that the user is attempting to access. The user enters UID and PW into the GUI and submits the form to initiate the authentication process 200.

In response to the user inputting UID and PW, the browser 204 provides a request 210 including UID to the server 104. In some examples, the browser 204 sends an OPTIONS HTTP request to a target URL (associated with the form) on the server, which transports the UID in a dedicated request header (e.g., X-Auth-UID). In some examples, the request 210 has the sole purpose of initiating an authentication handshake. Consequently, if the authentication form contains additional input elements, none of these values are sent along with the request 210.

In response to receiving the request, the server 104 uses the UID to lookup $SPH_{UID}$ and $SALT_{UID}$. The server 104 calculates the server public Diffie-Hellman key (SPK-sever public key). The SPK is encrypted using $SPH_{UID}$ as the encryption key:

$$enc(SPK)_{SPHUID}$$

The server 104 replies to the request 210 with a response 212. In some examples, the response 212 includes a "401 Unauthorized" response along with a response header (e.g., WWW-Authenticate: Auth) response header, notifying the browser 204 that the browser 204 is expected to finish the authentication handshake. Furthermore, the response 212 carries the following example headers/values:

X-Auth-ESPK/enc(SPK)$_{SPHUID}$
X-Auth-Salt/SALT$_{UID}$
X-Auth-Expires/t$_{EXPIRE}$
X-Better-Policy/PI$_1$, ..., PI$_n$ where t$_{EXPIRE}$ is a timespan for which the resulting shared key is valid, and PI$_1$, ..., PI$_n$ indicates a list of the application's public interfaces.

Using the received SALT$_{UID}$ and the PW input by the user to the authentication form, the browser 204 determines $SPH_{UID}$, which is used to decrypt enc(SPK)$_{SPHUID}$ to obtain SPK. In some examples, $SPH_{UID}$ is calculated by the browser using SALT$_{UID}$, PW and a hash function. An example hash function can include SHA256. It is appreciated, however, that any appropriate hash function can be used. After choosing a secret exponent, the browser 204 can calculate both the browser public Diffie-Hellman key (BPK—browser public key) and the resulting Diffie-Hellman secret key using SPK. In some examples, the Diffie-Hellman secret key forms the shared session key (SSK—session signing key), which is used for the resultant authenticated session (e.g., used to sign further requests to the server 104). The browser 204 encrypts its public key by calculating enc(BPK)$_{SPHUID}$.

In some implementations, the browser 204 provides a request 214 to the server 104. In some examples, the request 214 includes a HTTP request (e.g., GET or POST depending on the action of the HTML form). In some examples, all potential values that are contained in the authentication form are added to the request 214 as parameters (e.g., all potential values that were not included in the request 210). In some examples, enc(BPK)$_{SPHUID}$ is communicated within the request 214 using a header (e.g., X-Auth-EBPK header). In some examples, this request carries a request signature (ReqSig) using an HMAC calculated with SSK. In some examples, ReqSig is provided in the Authorization header of the request 214.

The server 104 receives the request 214. The server 104 decrypts enc(BPK)SPH$_{UID}$ (e.g., dec(enc(BPK)$_{SPHUID}$)$_{SPHUID}$) to obtain BPK and also calculates SSK. Using SSK, the server 104 verifies the correctness of ReqSig. Only if the PW entered by the user in the password dialogue is identical with the PW used to generate the server-side SPH$_{UID}$, the decryption and encryption actions result in the identical SSK value on both the server- and the browser-side. Consequently, if the server 104 can verify ReqSig, the client authentication was successful. If the verification fails, the server 104 reverts resends the "401 Unauthorized" response.

If ReqSig is verified, the server provides a response 216 (e.g., a "200 Found" response (request succeeded)), and sends the content of the protected resource (e.g., the web page) to the browser 204. To finalize the mutual authentication protocol, the server 104 signs the response body and selected headers using SSK. In some examples, the resulting response signature (ResSig) is communicated in a X-Auth-ServerSig header.

The browser 204 receives the response 216 and uses SSK to verify ResSig. If ResSig is verified, the content of the response 216 is rendered by the browser 204 and SSK is added to the session state to be used for signing subsequent requests sent from the browser 204 to the server 104. If ResSig is not verified, the browser 204 can alert the user that mutual authentication has failed. In some examples, the browser 204 can prompt the user to try again.

As depicted in FIG. 3, the mutual authentication protocol 200 follows currently established HTTP communication patterns (e.g., basic/digest authentication exchange or cross-origin resource sharing (CORS) preflight handling). In some implementations, because the browser 204 and the server 104 share a secret key after the initial authentication, implementations of the present disclosure can be extended to include response integrity and communication confidentiality.

Implementations of the authentication tracking protocol are relatively lightweight. Upon successful mutual authentication, the browser 204 treats further interactions with the server 104 as authenticated interactions. Consequently, all requests to the server 104 that qualify to be signed according to the rationale discussed above transparently receive a ReqSig before being sent. In some examples, one or more tests are performed and one or more actions are performed.

An example test includes checking that the target URL of the request points to a domain, for which a valid authentication context exists. In some examples, such an authentication context exists, if a valid SSK that is assigned to the domain and has not yet expired is provided in a key storage. Another example test includes verifying that the request is entitled to be signed. In some examples, the request is entitled to be signed if the request was generated within the application, and/or the target of the request is included in the list of public interfaces (e.g., PI$_1$, ..., PI$_n$). In some examples, it can be determined that the request was generated within the application when the HTML element that created the request (e.g., hyperlink-navigation, form submission, or JavaScript action) is rendered within the browser 204 in the origin of the authenticated application.

An example action includes normalizing the request data (e.g., method, URL, selected HTTP headers, request body) and creating an HMAC signature using SSK$_{APP}$ as the signature key. Another example action includes attaching the resulting ReqSig to the request in an Authorization header.

Example practical implementations of the present disclosure will be discussed. The example practical implementations include a native implementation and a transitional implementation.

In some examples, a native browser implementation can be realized as a browser extension. In some examples, the extension hooks itself as an observer into the browser's rendering process and monitors the outgoing requests. Whenever an authentication is initiated with website that is enabled with implementations of the authentication scheme of the present disclosure, or a request is sent to a domain for which an established authentication context exists (using the authentication scheme of the present disclosure), the extension becomes active.

Continuing with the example native implementations, if an HTML form is processed during rendering, the extension becomes active and the submission process of this form is intercepted. In some examples, the form can be marked with a custom attribute (e.g., data-purpose="mutualauth"). In some examples, before submitting the form, the username and password data is retrieved from the request data and is used to initiate the authentication handshake. In some examples, after receiving the "401 Unauthorized" response, the extension removes the password value from the request's data and submits the form.

Continuing with the example native implementation, and as discussed above, the authentication tracking protocol mimics the behavior of browsers in respect to automatically adding cookie headers to requests that are targeted to the cookie's domain. In some examples, the extension keeps track of currently active authentication contexts. Whenever a request is targeted toward a domain, for which such an authentication context exists, the extension verifies that the request originated from within this authenticated context or whether the target URL is listed in the list of public interfaces. If one of these conditions is satisfied, the extension transparently signs the outgoing request.

With regard to an example transitional implementation, implementations of the authentication scheme enable the use of a pure JavaScript fallback for browsers which would not otherwise natively support the authentication scheme. In this manner, the transitional implementation can be supported, which enables application developers to use the authentication scheme without requiring a separate authentication scheme for legacy browsers. In some examples, native navigation operations (e.g., form submissions and page transitions) are replaced with a JavaScript initiated loading mechanism. In this manner, the initial authentication handshake can be executed and all further outgoing requests can be signed using JavaScript before they are sent to the server. In some examples, the transitional implementations can be realized using a plurality of distinct elements: a dedicated form handling for the initial authentication, a request signing component, a dedicated page loader object for pure page transitions, and domain isolation to keep the key material out of reach of potentially untrusted JavaScript code.

Continuing with the example transitional implementation, realizing the actual initial authentication handshake is straightforward. In some examples, the HTML form, which is enabled for the authentication scheme, executes a JavaScript function upon form submission. The JavaScript function conducts the key exchange handshake. For this purpose, the username and password values can be read from the document object model (DOM) elements. In some examples, using the XMLHttpRequest object, the JavaScript creates an OPTIONS request to the server's authentication interface. After receiving the server's encrypted Diffie-Hellman key and the optional password salt in the "401 Unauthorized" response, the JavaScript calculates the browser's Diffie-Hellman key and encrypts it with the password. Further, after sending the key to the server, the JavaScript calculates the SSK using the key fragments.

Continuing with the example transitional implementation, and as discussed above, it is unacceptable for any aspect of the authentication scheme to introduce security flaws that are not present in traditional authentication schemes (e.g., no security regression). Consequently, measures are provided to separate the key material from potentially untrusted JavaScript code. In some examples, to achieve this, implementations of the authentication tracking protocol can require that the SSK is only handled by standard JavaScript functions. A careless implementation would lead to a situation in which a XSS-attack could be used, for example, to steal the SSK and leak the SSK to a malicious user. Such an attack would be comparable to XSS-based cookie stealing, which can effectively be mitigated using the HTTPonly cookie flag.

Accordingly, to avoid security regression, implementations of the present disclosure ensure that the key material is kept out of reach of untrusted parties. In some examples, to achieve this, guarantees provided by the same-origin policy and the postMessage API can be leveraged. In some examples, a separate sub-domain is introduced, which is responsible for handling and storing the SSK. In some examples, the sub-domain only contains static JavaScript dedicated to isolating the SSK and nothing else. Accordingly, the code running in this origin (the sub-domain) is well audited and is XSS-free. In some examples, an HTML document hosted on the sub-domain, and which contains any needed JavaScripts, is included in the pages of the main application using an invisible iframe.

Continuing with the example transitional implementation, the main application communicates with the key handling JavaScripts on the secure sub-domain using the postMessage API. In some examples, the postMessage API is a mechanism by which two browser documents are able to communicate across domain boundaries in a secure manner. A postMessage can be sent by calling the method postMessage (message, targetOrigin). While the message attribute takes a string message, the targetOrigin attribute represents the origin of the receiving page. In order to receive such a message the receiving page registers an event handler function for the message event. When receiving a message via the event handler function, the browser passes additional metadata to the receiving page. In some examples, the additional metadata includes the origin of the sender. Consequently, the postMessage API can be used to verify the authenticity of the sending page.

If the sending page is authenticated (e.g., a successful key exchange), the component responsible for the initial handshake passes the SSK key via postMessage to the secure sub-domain. The receiving JavaScript stores the SSK, depending on the configured lifespan of the SSK, either via the sessionStorage of the sub-domain or a localStorage mechanism.

Continuing with the example transitional implementation, following the initial authentication, all further requests are to carry a correct HMAC signature in order to be recognized as authenticated. Consequently, all outgoing requests are initiated via JavaScript. In some examples, this is achieved by replacing hyperlink targets and form actions with JavaScript event handlers, which pass the target URL to the signing component. In some examples, the signing component normalizes the request data and passes the normalized request data, using the post-message API of the browser, to the secure iframe. The following example listing (Listing 1) can be provided:

Listing 1: Example Request Initiation

```
<a href="#" onclick=
    "initAuthRequest ('submod.jsp?a=b')">
<script >
window.addEventListener
    ("message", handleSignedRequest);
// Get request signature
function initAuthRequest(requestData){
    var rq = normalize(requestData);
    window.postMessage(rq,"http://secure.app.com")
    return false;
}
// receive signed request
function handleSignedRequest (event){
    if(event.origin === "http://secure.app.com"){
    [attach request signature to request]
    }
}
</ script >
```

As discussed above, a feature of the postmessage API is that the origin domain of the incoming requests is communicated in a non-spoofable fashion. Consequently, the request signing script can verify that the call to the signing function was created within an authenticated context and not by an untrusted third party which. In some examples, the signing component retrieves the SSK from localStorage, conducts the signing process, and passes the resulting values back to the main application, again using the postMessage functionality. The following example listing (Listing 2) can be provided:

---

Listing 2: Example Request Signing Code on Secure Sub-Domain

```
window.addEventListener
    ("message", handleSignOrder);
// Create signed request
function handleSignOrder (event){
    if(authContext(event.origin)){
        var key = getSSK(event.origin)
        var sig = signReq(event.data, key)
        event.source.postMessage(sig, event.origin)
    }
}
```

---

In some examples, all page transitions and related request initiating actions of the main application utilize the request signing functionality. For newly written applications, this does not require significant effort to effort. Legacy applications can be adapted to support the above-described functionality. However, such legacy applications can easily be adapted by traversing the application's pages DOM on load and patching the encountered links and forms to use the request signing functionality. In some examples, for applications that rely on AJAX driven client/server interactions, the request signing functionality can be transparently introduced by replacing the XMLHttpRequest object with an object wrapper that implements the actions.

Continuing with the example transitional implementation, a facility can be provided that enables external sites to navigate to the application's public interfaces. As discussed above, a public interface can include a URL of the application to which external sites are allowed to navigate in an authenticated state (e.g., for posting to social sharing sites). In some examples, a pageloader object can be used. In some examples, the page loader is provided as a JavaScript that is delivered by the application. In some examples, the JavaScript is delivered in cases where an unauthenticated request has been received for a URL that requires authentication and that is contained in the list of public interfaces for the application. In some examples, the JavaScript is carried in the body of the initial "401 Unauthorized" response during the key exchange handshake (the mutual authentication protocol). Consequently, if such a response is received during a standard web navigation process (as opposed to the explicit authentication handshake executed by the example implementations), the page loader is executed in an otherwise blank HTML document.

In some implementations, the source code of the page loader can by dynamically created by the server to contain the request data that is to be signed (e.g., including the original request's URL). In some examples, the page loader dynamically includes the iframe to the secure sub-domain and utilizes the standard request signing functionality (e.g., Listing 1) to create a second, now authenticated request. The strict origin checking mechanism of the signing interface of the sub-domain robustly prevents potential abuse.

Implementations of the authentication scheme of the present disclosure span the full authentication lifecycle, including both the initial authentication process and ongoing authentication tracking. In this manner, both a lightweight, consistent design is provided as well as robust, end-to-end security guarantees. Further, implementations of the authentication scheme are secure by default. That is, the security properties do not need to be explicitly enabled during the development phase. In some implementations, if implemented as a native browser component, for example, effective protection is provided against the full spectrum of currently documented weaknesses of the traditional authentication approaches. Such weakness can include susceptibility to password sniffing, session credential theft, session fixation, cross-site request forgery and/or phishing. More generally, implementations of the authentication scheme use established interaction patterns and primitives instead of introducing new native elements. In some examples, implementations of the authentication scheme can be provided using scripts (e.g., Javascript), even though implementations are generally designed to be adopted as a native capability of Web browsers. In this manner, web sites can use the authentication scheme in a transitional phase, in which only a subset of deployed Web browsers natively support the authentication scheme.

Figure 4:
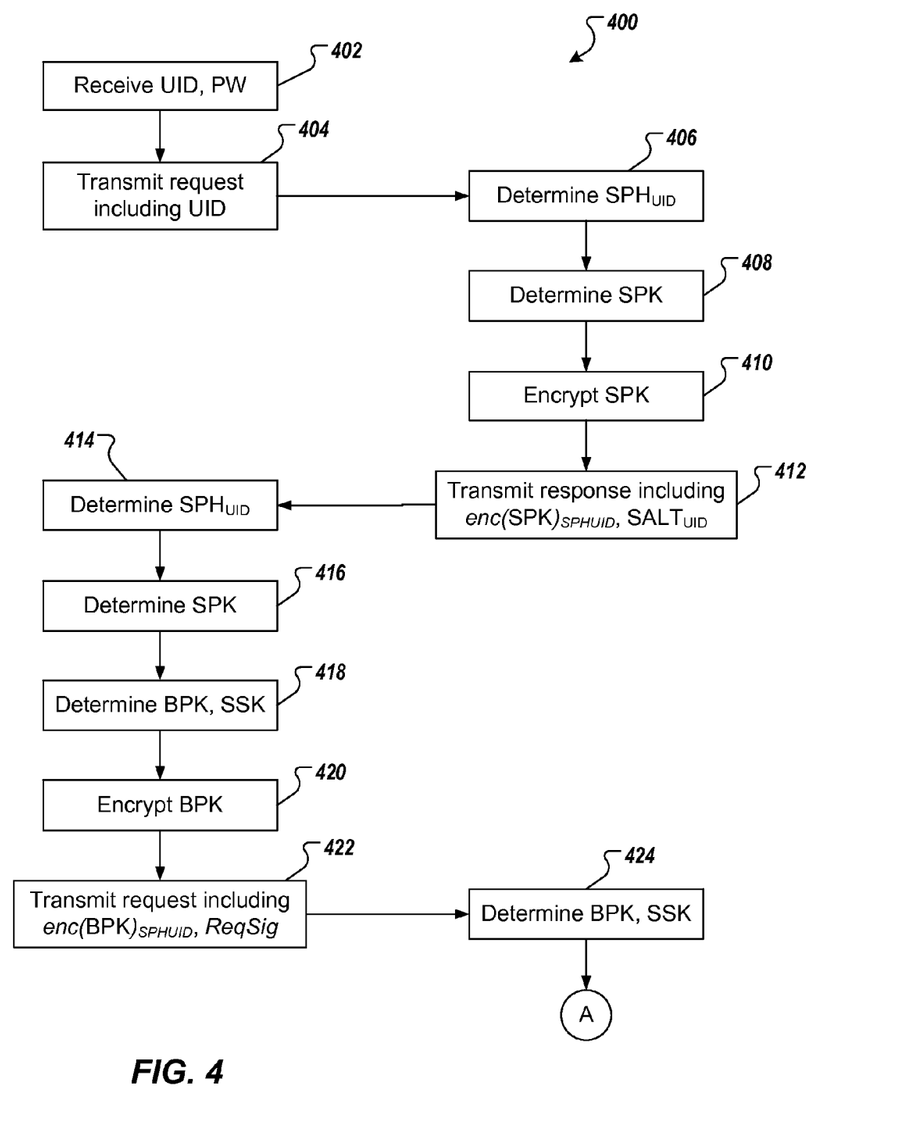
FIG. 4 depicts an example process that can be executed in accordance with implementations of the present disclosure.

FIG. 4 depicts an example process 400 that can be executed in accordance with implementations of the present disclosure. In some implementations, the example process 400 can be realized using one or more computer-executable programs (e.g., a browser, a web application) executed using one or more computing devices (e.g., a client-side computing device, a server-side computing device).

User credentials (e.g., UID, PW) are received (402). For example, a browser executed on a client (e.g., computing device) can display an HTML form provided from a web application hosted on a server (e.g., computing device), the HTML form including input elements to receive UID and PW input from a user. A request including UID is transmitted (404). For example, in response to the user submitting the UID and PW to the HTML form, the browser can generate a request that includes UID, but no other parameters, which request is transmitted to the application. $SPH_{UID}$ is determined (406). For example, the application can retrieve $SPH_{UID}$ and $SALT_{UID}$ from computer-readable memory based on UID. SPK is determined (408). For example, the application can determine SPK as a public Diffie-Hellman key. SPK is encrypted (410). For example, the application can encrypt SPK to provide $enc(SPK)_{SPHUID}$. A response including $enc(SPK)_{SPHUID}$ and $SALT_{UID}$ is transmitted (412). For example, the server can transmit the response to the browser.

$SPH_{UID}$ is determined (414). For example, the browser can use $SALT_{UID}$ (provided in the response) and PW (provided to the HTML form from the user) to determine $SPH_{UID}$. SPK is determined (416). For example, the browser uses SPHUID to decrypt $enc(SPK)_{SPHUID}$. BPK and SSK are determined (418). For example, the browser determines BPK as a public Diffie-Hellman key and a client-side SSK as a secret Diffie-Hellman key using SPK. BPK is encrypted (420). For example, the browser encrypts BPK using $SPH_{UID}$ to provide $enc(BPK)_{SPHUID}$. A request including $enc(BPK)_{SPHUID}$ and ReqSig is transmitted (422). For example, the browser generates ReqSig as an HMAC using SSK and transmits the request including $enc(BPK)_{SPHUID}$ and ReqSig to the server.

BPK and SSK are determined (424). For example, the application decrypts $enc(BPK)_{SPHUID}$ using $SPH_{UID}$ to determine BPK and determines a server-side SSK using SPK. It is determined whether ReqSig is verified (426). For example, the application determines whether the client-side SSK (determined from ReqSig) is identical to the server-side SSK. If the client-side SSK is identical to the server-side SSK, ReqSig is verified. If the client-side SSK is not identical to the server-side SSK, ReqSig is not verified. If ReqSig is not verified, the client is not authenticated (428). In some examples, the server can transmit an error message to the browser and/or invite the user to retry authentication. In some examples, ReqSig is verifiable, because ReqSig is calculated on the client-side using the client-side SSK, and the server-side uses the server-side SSK to independently calculate ReqSig. The server-side can compare the received, client-side ReqSig to the server-side ReqSig. If the client-side ReqSig and the server-side ReqSig are equal, the client-side SSK and the server-side SSK must also be the same.

Figure 5:
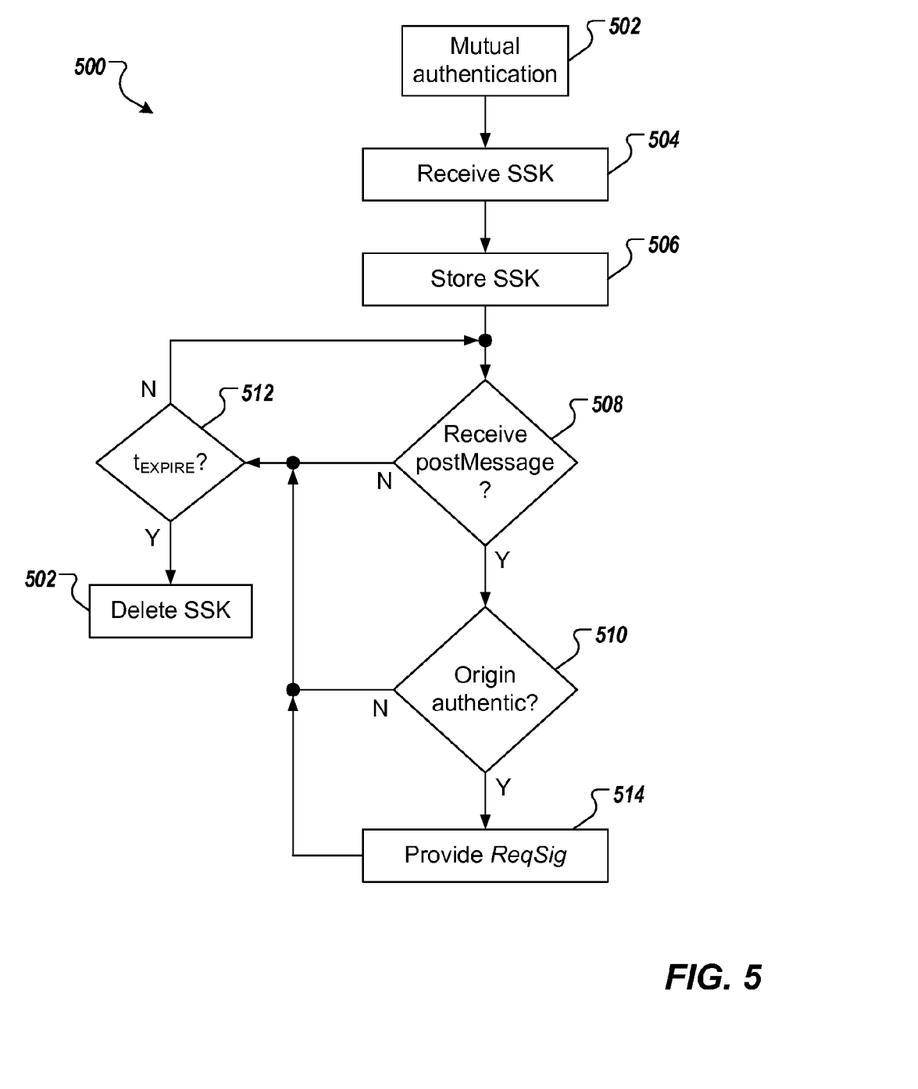
FIG. 5 depicts an example process that can be executed in accordance with implementations of the present disclosure.

If ReqSig is verified, the client is authenticated, and a response including ResSig is transmitted (430). For example, and in response to determining that ReqSig is verified, the application generates ResSig using the SSK. It is determined whether ResSig is verified (432). For example, the browser determines whether the server-side SSK (determined from ResSig) is identical to the previously determined client-side SSK. In some examples, ResSig is verifiable, because ResSig can be calculated on the client-side using the client-side SSK, and the server-side uses the server-side SSK to independently calculate ResSig. The client-side can compare the received, server-side ResSig to the client-side ResSig. If the client-side ResSig and the server-side ResSig are equal, the client-side SSK and the server-side SSK must also be the same. If the server-side SSK is identical to the client-side SSK, ResSig is verified. If the server-side SSK is not identical to the client-side SSK, ResSig is not verified. If ResSig is not verified, the server is not authenticated (434). In some examples, the browser can provide an error message and/or invite the user to retry authentication. If ResSig is verified, the client and the server are determined to be mutually authenticated (436). Consequently, the session between the browser and application is promoted to an authenticated state and further communications from at least the browser to the server can be signed (e.g., using ReqSig) to provide authentication tracking FIG. 5 depicts an example process 500 that can be executed in accordance with implementations of the present disclosure. In some implementations, the example process 400 can be realized using one or more computer-executable programs (e.g., a browser, a web application) executed using one or more computing devices (e.g., a client-side computing device, a server-side computing device).

The client and the server are determined to be mutually authenticated (502). For example, and as discussed above with reference to FIG. 4, if ResSig is verified, the client and the server are determined to be mutually authenticated (436). The SSK is received (504). For example, a secure sub-domain can receive the SSK (e.g., the client-side SSK) via a postMessage provided by an authentication script provided in an application domain. In some examples, the sub-domain includes a script (e.g., static JavaScript) that is solely tasked with handling the SSK and requests for ReqSig based on the SSK. In some examples, the script is provided in a HTML document that is hosted on the sub-domain and can be provided on a page of the application domain using an invisible iframe. The SSK is stored (506). For example, the script provided in the sub-domain stores the SSK via the sub-domain's sessionStorage or localStorage mechanism.

It is determined whether a postMessage is received (508). For example, a postMessage can be provided to the sub-domain in an effort to retrieve a request signature (ReqSig), and the script provided in the sub-domain can receive the postMessage. If a postMessage has not been received, it is determined whether $t_{EXPIRE}$ has lapsed (512). If a postMessage has been received, it is determined whether the origin of the postMessage is authentic (510). For example, the script can determine whether the origin provided in the targetOrigin attribute of the postMessage represents the origin of the receiving page. If the origin provided in the targetOrigin attribute of the postMessage represents the origin of the receiving page, the origin is determined to be authentic. Otherwise, the origin is not determined to be authentic. If the origin of the postMessage is not authentic, it is determined whether $t_{EXPIRE}$ has lapsed (512). If the origin of the postMessage is authentic, ReqSig is provided (514). For example, the script provided in the sub-domain generates ReqSig based on the SSK and provides SSK. If $t_{EXPIRE}$ has lapsed, SSK is deleted from storage (516). For example, after the pre-provided lifespan of the SSK has run, the SSK is deleted from storage. If $t_{EXPIRE}$ has not lapsed, the example process 500 loops back.

Figure 6:
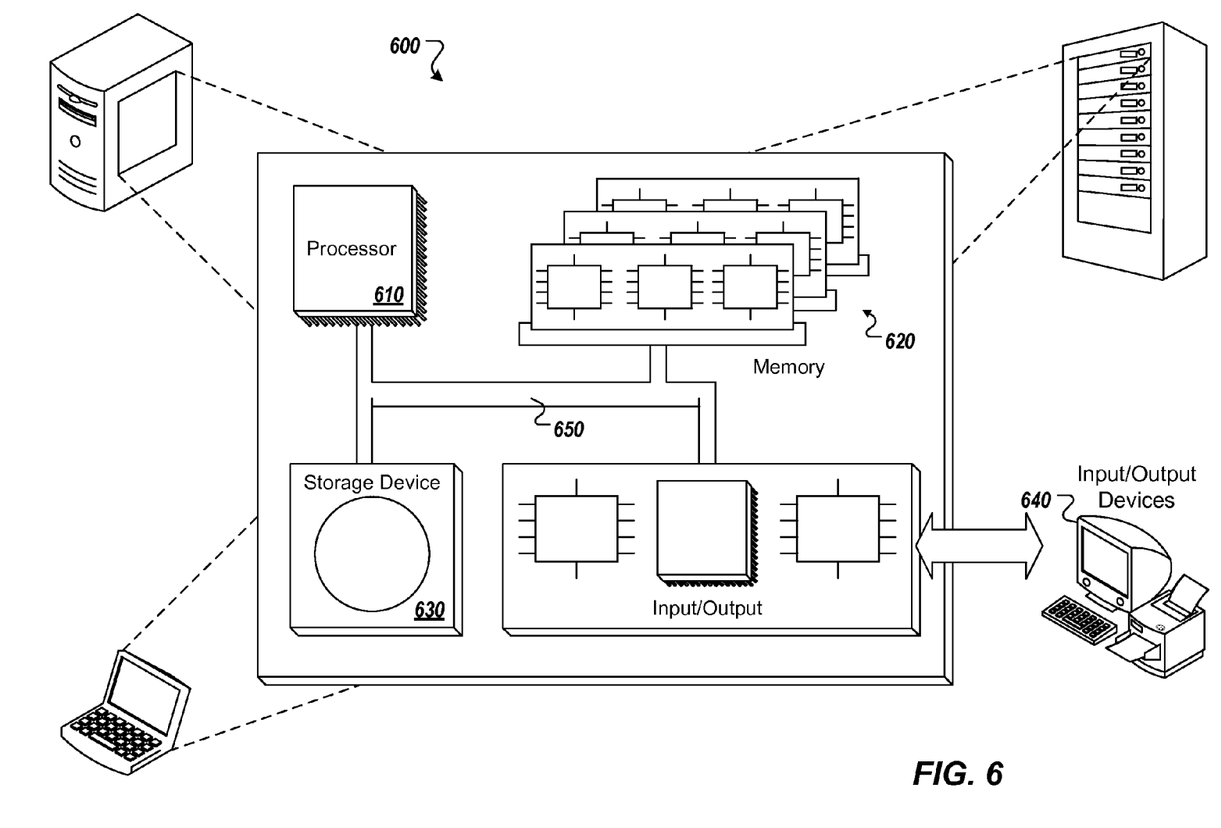
FIG. 6 is a schematic illustration of example computer systems that can be used to execute implementations of the present disclosure.

Referring now to FIG. 6, a schematic diagram of an example computing system 600 is provided. The system 600 can be used for the operations described in association with the implementations described herein. For example, the system 600 may be included in any or all of the server components discussed herein. The system 600 includes a processor 610, a memory 620, a storage device 630, and an input/output device 640. Each of the components 610, 620, 630, and 640 are interconnected using a system bus 650. The processor 610 is capable of processing instructions for execution within the system 600. In one implementation, the processor 610 is a single-threaded processor. In another implementation, the processor 610 is a multi-threaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit. The storage device 630 is capable of providing mass storage for the system 600. In one implementation, the storage device 630 is a computer-readable medium. In various different implementations, the storage device 630 may be a floppy disk device, a hard disk device, an optical disk device, or a tape device. The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. Elements of a computer can include a processor for executing instructions and one or more memories for storing instructions and data. Generally, a computer can also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations of the present disclosure have been described. Nevertheless, it will be understood that various modifications may be made without departing from the spirit and scope of the present disclosure. Accordingly, other implementations are within the scope of the following claims.

What is claimed is:

1. A computer-implemented method for secure client-side key storage for authentication tracking, the method being executed using one or more processors and comprising:
    establishing, by a browser executed on a client-side computing device, a mutual authentication between the client-side computing device and a server-side computing device, the client-side computing device comprising the one or more processors, and the server-side computing device executing an application;
    in response to establishing the mutual authentication, receiving a session signing key (SSK) at a sub-domain of an application domain, the sub-domain comprising a static script that handles the SSK and that selectively provides request signatures;
    receiving, at the sub-domain, a message requesting a request signature;
    determining that the message originated from an authentic origin; and
    in response to determining that the message originated from an authentic origin, providing a request signature to a source of the message, the request signature being based on the SSK.

2. The method of claim 1, wherein determining that the message originated from an authentic origin comprises:
    comparing a target origin attribute of the message to one or more authentic origins, the one or more authentic origins comprising the authentic origin; and
    determining that the target origin is identical to the authentic origin.

3. The method of claim 2, wherein the message comprises a postMessage that is received through a postMessage application program interface (API).

4. The method of claim 1, wherein the static script stores the SSK upon receiving the SSK.

5. The method of claim 4, wherein the SSK is stored in at least one or local storage and session storage.

6. The method of claim 1, wherein the static script is provided in a document hosted on the sub-domain, the document being included in a web page of the application domain using an invisible iframe.

7. The method of claim 1, wherein the SSK is provided as a client-side SSK that is generated during a mutual authentication scheme to mutually authenticate a user of the client-side computing device and the application to each other.

8. The method of claim 1, further comprising determining that an expiration time of the SSK has lapsed and, in response, deleting the SSK from memory.

9. A non-transitory computer-readable storage medium coupled to one or more processors and having instructions stored thereon which, when executed by the one or more processors, cause the one or more processors to perform operations for secure client-side key storage for authentication tracking, the operations comprising:
    establishing, by a browser executed on a client-side computing device, a mutual authentication between the client-side computing device and a server-side computing device, the client-side computing device comprising the one or more processors, and the server-side computing device executing an application;
    in response to establishing the mutual authentication, receiving a session signing key (SSK) at a sub-domain of an application domain, the sub-domain comprising a static script that handles the SSK and that selectively provides request signatures;
    receiving, at the sub-domain, a message requesting a request signature;

determining that the message originated from an authentic origin; and in response to determining that the message originated from an authentic origin, providing a request signature to a source of the message, the request signature being based on the SSK.

10. A system, comprising:

a client-side computing device; and a computer-readable storage device coupled to the client-side computing device and having instructions stored thereon which, when executed by the client-side computing device, cause the client-side computing device to perform operations for secure client-side key storage for authentication tracking, the operations comprising:

establishing, by a browser executed on a client-side computing device, a mutual authentication between the client-side computing device and a server-side computing device, the client-side computing device comprising one or more processors, and a server-side computing device executing an application;

in response to establishing the mutual authentication, receiving a session signing key (SSK) at a sub-domain of an application domain, the sub-domain comprising a static script that handles the SSK and that selectively provides request signatures;

receiving, at the sub-domain, a message requesting a request signature;

determining that the message originated from an authentic origin; and in response to determining that the message originated from an authentic origin, providing a request signature to a source of the message, the request signature being based on the SSK.

* * * * *